United States Patent [19]

Mori et al.

[11] Patent Number: 5,783,625
[45] Date of Patent: Jul. 21, 1998

[54] ADHESIVE COMPOSITION AND COMPOSITE OF RUBBER WITH FIBER

[75] Inventors: Osamu Mori, Kamakura; Mitsugu Ishihara, Kawasaki, both of Japan

[73] Assignee: Nippon Zeon Co., Ltd., Tokyo, Japan

[21] Appl. No.: 477,636

[22] Filed: Jun. 7, 1995

[30] Foreign Application Priority Data

Sep. 28, 1994 [JP] Japan .................................. 6-258690

[51] Int. Cl.⁶ ...................................... C08L 61/06
[52] U.S. Cl. ................... 524/509; 524/510; 524/541; 524/501; 524/430; 524/432; 524/433
[58] Field of Search .................... 524/509, 510, 524/430, 432, 433, 501, 541

[56] References Cited

U.S. PATENT DOCUMENTS

| | | |
|---|---|---|
| 4,246,156 | 1/1981 | Heins et al. .................... 524/460 |
| 5,017,639 | 5/1991 | Mori et al. .................... 524/510 |
| 5,077,127 | 12/1991 | Mori et al. .................... 428/390 |
| 5,159,010 | 10/1992 | Mori et al. .................... 524/510 |
| 5,272,202 | 12/1993 | Kubo et al. .................... 524/565 |

*Primary Examiner*—George F. Lesmes
*Assistant Examiner*—John J. Guarriello
*Attorney, Agent, or Firm*—Armstrong, Westerman, Hattori, McLeland & Naughton

[57] ABSTRACT

An adhesive composition comprised of (A) a latex of a self-crosslinking, carboxyl group-containing highly saturated nitrile-conjugated diene copolymer rubber containing 0.3–10 wt. % of self-crosslinking monomer units, and (B) a resorcinol-formaldehyde resin. A composite comprised of a fibrous material, which has been treated with the adhesive composition, and a nitrile group-containing highly saturated copolymer rubber. This composite is useful for belts.

7 Claims, No Drawings

ADHESIVE COMPOSITION AND COMPOSITE OF RUBBER WITH FIBER

BACKGROUND OF THE INVENTION

(1) Field of the Invention

This invention relates to an adhesive composition, and a composite such as, for example, a belt which is comprised of a fibrous material, treated with the adhesive composition, and a nitrile group-containing highly saturated copolymer rubber.

(2) Description of the Related Art

Belts such as an automobile timing belt, a poly-ribbed belt, a lapped belt and a V-belt are made of a composite comprised of a base fibrous material usually in a fabric form and a rubber. As the rubber, chloroprene rubber (CR) and an acrylonitrile-butadiene copolymer rubber (NBR), which have a good oil resistance, heretofore have been widely used. But, recently, there is an increasing demand for a nitrile group-containing highly saturated copolymer rubber which has good heat resistance as well as good oil resistance and thus meets requirements such as regulations for automobile exhaust gas, minimization of an engine room for weight-saving of an automobile, and encasement of an engine room for noise reduction.

Taking a timing belt as an example of the belts, the geared portion thereof is reinforced with a nylon base fabric. The nylon base fabric is treated with a rubber cement in an organic solvent for minimizing the abrasion of the belt caused by toothing with gears, and for enhancing the adhesion between the base fabric and the rubber. However, in recent years, the treatment of an organic solvent has caused a problem of environmental pollutions, and thus, a treatment with an aqueous rubber cement is now desired.

As adhesives for a nitrile group-containing highly saturated copolymer rubber with a fibrous material there have heretofore been proposed an adhesive composition comprising a latex of a nitrile group-containing highly saturated copolymer rubber having an iodine value of not larger than 120 and a resorcinol-formaldehyde resin (Japanese Unexamined Patent Publication No. 63-248879); and an adhesive composition comprising a nitrile group-containing highly saturated copolymer rubber latex and a resorcinol-formaldehyde resin, which rubber latex is made by selectively hydrogenating the carbon-to-carbon double bonds of a nitrile group-containing unsaturated copolymer rubber in a latex, obtained by an emulsion polymerization procedure, in the presence of a hydrogenation catalyst (Japanese Unexamined Patent Publication No. 3-167239). The proposed adhesive compositions are aqueous and thus the problem of environmental pollution does not arise. Further, the fibrous material having been treated with these adhesive compositions exhibits an enhanced adhesion to the nitrile group-containing highly saturated copolymer rubber.

However, the fibrous material, which has been treated with the above-mentioned adhesive composition comprising the nitrile group-containing highly saturated copolymer rubber latex and a resorcinol-formaldehyde resin, has a poor abrasion resistance as compared with the fibrous material treated with an organic solvent-containing rubber cement. This poor abrasion becomes conspicuous especially where the fibrous material is used for belts.

SUMMARY OF THE INVENTION

An object of the present invention is to provide an aqueous adhesive composition which is capable of imparting good water resistance and strength at a high temperature as well as good abrasion resistance to a fibrous material used for reinforcing a rubber.

Another object of the present invention is to provide an aqueous adhesive composition which is capable of markedly enhancing abrasion resistance of a composite comprised of a nitrile group-containing highly saturated copolymer rubber and a fibrous material, especially a belt comprised of this rubber and a base fabric such as canvas.

A further object of the present invention is to provide a composite such as a belt comprised of nitrile group-containing highly saturated copolymer rubber and a fibrous material, characterized as exhibiting good abrasion resistance, water resistance and strength at a high temperature.

In one aspect of the present invention, there is provided an adhesive composition comprising (A) a latex of a self-crosslinking, carboxyl group-containing highly saturated nitrile-conjugated diene copolymer rubber containing 0.3 to 10% by weight, based on the weight of the copolymer rubber, of self-crosslinking monomer units, and (B) a resorcinol-formaldehyde resin.

In another aspect of the present invention, there is provided a composite comprised of an adhesive-treated fibrous material and a nitrile group-containing highly saturated copolymer rubber, said adhesive comprising (A) a latex of a self-crosslinking, carboxyl group-containing highly saturated nitrile-conjugated diene copolymer rubber containing 0.3 to 10% by weight, based on the weight of the copolymer rubber, of self-crosslinking monomer units, and (B) a resorcinol-formaldehyde resin.

DESCRIPTION OF THE PREFERRED EMBODIMENTS (A) Self-Crosslinking, Carboxyl Group-Containing Highly Saturated Nitrile/Conjugated Diene Copolymer Rubber Latex The self-crosslinking, carboxyl group-containing highly saturated nitrile-conjugated diene copolymer rubber latex used in the present invention is prepared by hydrogenating a self-crosslinking, carboxyl group-containing unsaturated nitrile-conjugated diene copolymer rubber in a latex form, which is usually made by an emulsion polymerization procedure. The procedure for hydrogenation is described, for example, in Japanese Unexamined Patent Publication No. 2-178305,and ibid. No. 3-167239.

The self-crosslinking, carboxyl group-containing highly saturated nitrile-conjugated diene copolymer rubber has an iodine value of not larger than 120, preferably not larger than 80. If the iodine value exceeds 120, the fibrous material treated with the adhesive composition exhibits a poor heat resistance.

The self-crosslinking, carboxyl group-containing unsaturated nitrile-conjugated diene copolymer rubber is comprised of conjugated diene monomer units, α, β-unsaturated nitrile monomer units, ethylenically unsaturated carboxylic acid monomer units and ethylenically unsaturated self-crosslinking monomer units. Preferably, this copolymer rubber is comprised of 30 to 80% by weight of conjugated diene monomer units, 10 to 60% by weight of α, β-unsaturated nitrile monomer units, 0.3 to 10% by weight of an ethylenically unsaturated self-crosslinking monomer units and 1 to 10% by weight of ethylenically unsaturated carboxylic acid monomer units, based on the total weight of the copolymer rubber.

The conjugated diene monomer used for the preparation of the self-crosslinking, carboxyl group-containing highly saturated nitrile-conjugated diene copolymer rubber is not particularly limited. As specific examples of the conjugated diene monomer, there can be mentioned aliphatic conjugated diene monomers such as 1,3-butadiene, isoprene, 2,3-dimethylbutadiene, 1,3-pentadiene and halogen-substituted butadiene. These conjugated diene monomers can be used either alone or in combination.

The α, β-unsaturated nitrile monomer also is not particularly limited provided that it has a nitrile group and a polymerizable double bond. As specific examples thereof, there can be mentioned acrylonitrile and methacrylonitrile.

The ethylenically unsaturated carboxylic acid monomer used for introducing a carboxyl group into the nitrile-conjugated diene copolymer includes, for example, acrylic acid, methacrylic acid, itaconic acid and maleic acid.

To enhance the adhesion and abrasion resistance to a considerable extent, the ethylenically unsaturated carboxylic acid monomer is used preferably in an amount such that the highly saturated nitrile-conjugated diene copolymer rubber contains at least 0.02 equivalent weight per 100 parts by weight (ephr) of the copolymer, more preferably in the range of 0.02 to 0.10 ephr, of a carboxylic group.

To exhibit a markedly enhanced abrasion resistance, the carboxylic group-containing highly saturated nitrile-conjugated diene copolymer rubber used in the present invention must contain ethylenically unsaturated self-crosslinking monomer units. The amount of the self-crosslinking monomer is 0.3 to 10% by weight, preferably 0.5 to 5% by weight. A high abrasion resistance can be obtained even when its amount exceeds 10% by weight. But, when the amount of the self-crosslinking monomer is too large, the adhesion between the base fabric and the rubber is reduced and the flexibility of the treated base fabric is lowered.

As specific examples of the ethylenically unsaturated self-crosslinking monomer, there can be mentioned N-methylolacrylamide, N-methylolmethacrylamide, N,N'-dimethylolacrylamide, N,N'-dimethylolmethacrylamide, acrylamide, methacrylamide, N-methoxymethylacrylamide, N-methoxymethylmethacrylamide, N-ethoxymethylacrylamide N-ethoxymethylmethacrylamide, N-butoxymethylacrylamide, N-butoxymethylmethacrylamide and N,N'-methylenebisacrylamide. Especially when a nylon base fabric is used, N-methylol group-containing monomers such as N-methylolacrylamide and N-methylolmethacrylamide are prefrable for the intended enhancement of abrasion resistance.

The self-crosslinking, carboxyl group-containing highly saturated nitrile-conjugated diene copolymer rubber used in the present invention must contain both the self-crosslinking monomer units and carboxyl groups. If one of the self-crosslinking monomer units and carboxyl groups is not contained, the resulting composite is not satisfactory in at least one of the abrasion resistance, water resistance and strength at a high temperature.

If desired, other copolymerizable ethylenically unsaturated monomer can be copolymerized with the α, β-unsaturated nitrile monomer, conjugated diene monomer, ethylenically unsaturated self-crosslinking monomer and ethylenically unsaturated carboxylic acid monomer. The amount of the copolymerizable ethylenically unsaturated monomer is usually up to 50% by weight based on the total weight of the copolymer.

As specific examples of the copolymerizable ethylenically unsaturated monomer, there can be mentioned esters of the above-recited unsaturated carboxylic acids such as methyl acrylate, methyl methacrylate, ethyl acrylate, ethyl methacrylate, butyl acrylate, butyl methacrylate, 2-ethylhexyl acrylate, 2-ethylhexyl methacrylate, trifluoroethyl acrylate, trifluoroethyl methacrylate, tetrafluoropropyl acrylate, tetrafluoropropyl methacrylate, ethyl itaconate, butyl fumarate, butyl maleate, methoxymethyl acrylate, methoxymethyl methacrylate, ethoxyethyl acrylate, ethoxyethyl methacrylate, methoxyethoxyethyl acrylate and methoxyethoxyethyl methacrylate; cyanoalkyl esters of acrylic acid and methacrylic acid such as cyanomethyl acrylate, cyanomethyl methacrylate, 2-cyanoethyl acrylate, 2-cyanoethyl methacrylate, 1-cyanopropyl acrylate, 1-cyanopropyl methacrylate, 2-ethyl-6-cyanohexyl acrylate, 2-ethyl-6-cyanohexyl methacrylate, 3-cyanopropyl acrylate and 3-cyanopropyl methacrylate; fluoroalkyl vinyl ethers such as fluoroethyl vinyl ether; and vinylpyridine. The copolymerizable monomer further includes, for example, N-(anilinophenyl) acrylamide, N-(anilinophenyl) methacrylamide, N-(anilinophenyl) cinnamamide, N-(anilinophenyl) crotonamide, N-(anilinophenyl)amino2-hydroxypropyl allyl ether, N-(anilinophenyl)amino-2-hydroxypropyl methallyl ether, 5-N-(4-anilinophenyl) amino-2-hydroxypentyl acrylate and 5-N-(4-anilinophenyl) amino-2-hydroxypentyl methacrylate.

The emulsion polymerization procedure by which the above-mentioned monomers are copolymerized is not particularly limited. Any of a batchwise, semi-batchwise or continuous method can be employed. The polymerization temperature and pressure also are not particularly limited.

The emulsifier used for the emulsion polymerization is not particularly limited. Anionic, cationic, nonionic and ampholytic surface active agents can be employed. Of these, an anionic surface active agent is preferable. The amount of the emulsifier also is not particularly limited, but is usually in the range of 1 to 10 parts by weight, preferably 2 to 6 parts by weight based on 100 parts by weight of the sum of the monomers, in view of the adhesion of the adhesive composition.

Conventional polymerization initiators and molecular weight modifiers can be employed.

Adhesive Composition

The adhesive composition of the present comprises (A) a self-crosslinking, carboxyl group-containing highly saturated nitrile-conjugated diene copolymer rubber and (B) a resorcinol-formaldehyde resin.

The resorcinol-formaldehyde resin is not particularly limited, and those which are well known (which are described, for example, in Japanese Unexamined Patent Publication No. 55-142635) can be used. The ratio of resorcinol and formaldehyde used for the preparation of the resorcinol-formaldehyde resin is usually 1:1 to 1:5 by mole, preferably 1:1 to 1:3 by mole.

The amount of the resorcinol-formaldehyde resin in the adhesive composition is usually in the range of 5 to 30 parts by weight, preferably 8 to 20 parts by weight, based on 100 parts by weight of the solid content in the latex of the self-crosslinking, carboxyl group-containing highly saturated nitrile/conjugated diene copolymer rubber. If the amount of the resorcinol-formaldehyde resin is too large, the adhesive applied to the fibrous material becomes very hard and has no flexibility, and thus, the abrasion resistance of the adhesive-treated fibrous material is drastically reduced.

If desired, conventional adhesion-enhancing materials can be incorporated in the adhesion composition. Such adhesion-enhancing materials include, for example, 2,6-bis-(2,4-dihydroxyphenylmethyl)-4-chlorophenol or analogues thereof, an isocyanate, blocked isocyanate, ethylene urea, polyepoxide and a modified polyvinyl chloride.

If desired, compounds of metals of group II of the periodic table can be incorporated in the adhesive composition to improve abrasion resistance of the abrasive-treated fibrous material. The metals of group II of the periodic table include, for example, magnesium (Mg), calcium (Ca), barium (Ba) and zinc (Zn). As the compounds of these metals, there can be mentioned oxides and hydroxides of these metals. Especially zinc oxide is most preferable.

The amount of the compound of group II metal is usually not larger than 5 parts by weight, preferably not larger than 3 parts by weight, based on 100 parts by weight of the solid content in the latex of the self-crosslinking carboxyl group-containing highly saturated nitrile-conjugated diene copolymer rubber. The compound of group II metal is preferably incorporated in the form of An aqueous dispersion into the adhesive composition.

A rubber-vulcanizing agent such as sulfur and a vulcanization accelerator can be incorporated in the adhesive composition to further improve the abrasion resistance of the abrasive-treated fibrous material. Further, an aqueous dispersion of carbon black can be incorporated in the adhesive composition provided that the objects of the present invention are not injured.

Further, the latex of the self-crosslinking, carboxyl group-containing highly saturated nitrile-conjugated diene copolymer rubber can be partly substituted by a latex of other rubbers provided that the objects of the present invention are not injured. As the latex of other rubbers, there can be mentioned a styrene-butadiene copolymer rubber latex and modified latexes thereof, an acrylonitrile-butadiene copolymer latex and modified latexes thereof, a chloroprene rubber latex, a chlorosulfonated polyethylene latex and a natural rubber latex. These rubber latexes can be used either alone or in combination.

Treatment of Fibrous Material with Adhesive Composition

The fibrous material which is treated by the adhesive composition of the present invention can be made of various fibers. The fibers used include, for example, cotton, vinylon, rayon, nylon, a polyester fiber and an aramid fiber. These fibers can be used in the form of, for example, a staple fiber, a filament, a code and a fabric such as canvas. Of these, canvas is most preferable for the provision of a belt having a high abrasion resistance.

The procedure by which the fibrous material is treated with the adhesive composition is not particularly limited, and conventional procedures employed for treating the known resorcinol-formaldehyde resin/polymer latexes can be employed. For example, a base fabric is dipped in a solution of the adhesive composition and, if desired, dried at a temperature of about 100° to 150° C. for 0.5 to 10 minutes, and then heat-treated. The heat-treatment is carried out under temperature and time conditions such that the adhesive composition applied by the dipping reacts and is cured and the reactive group such as N-methylol group of the self-crosslinking monomer reacts to form a crosslink. Usually the treating temperature and time are about 130° to 250° C. and several minutes, respectively. According to the particular type of the base fabric, the base fabric can be dipped in an isocyanate solution, an epoxy resin solution or a mixed solution thereof, followed by drying, prior to the treatment with the adhesive composition. The drying in this pretreatment is preferably carried out at a temperature not higher than the drying temperature employed after dipping in the adhesive composition.

The amount of the adhesive composition deposited on the fibrous material is usually 2 to 40% by weight, preferably 3 to 30% by weight, based on the weight of the fibrous material.

Composite of Rubber with Fibrous Material

As the nitrile group-containing highly saturated copolymer rubber which is combined with the adhesive-treated fibrous material, those which are known and described, for example, in Japanese Examined Patent Publication No. 2-43767, Japanese Unexamined Patent Publication No. 63-248879 and ibid. No. 3-167239 can be used. A nitrile group-containing highly saturated copolymer rubber similar to the above-mentioned carboxyl group-containing highly saturated nitrile-conjugated diene copolymer rubber can also be used.

As specific examples of the nitrile group-containing highly saturated copolymer rubber, there can be mentioned a hydrogenated product of a butadiene-acrylonitrile copolymer rubber, a hydrogenated product of an isoprene-butadiene-acrylonitrile copolymer rubber, a hydrogenated product of an isoprene-acrylonitrile copolymer rubber, a butadiene-methyl acrylate-acrylonitrile copolymer rubber and a hydrogenated product thereof, a butadiene-acrylic acid-acrylonitrile copolymer rubber and a hydrogenated product thereof, a butadiene-ethylene-acrylonitrile copolymer rubber, a butyl acrylate-ethoxyethyl acrylate-vinyl chloroacetate- acrylonitrile copolymer rubber, and butyl acrylate-ethoxy-ethyl acrylate-vinylnorbotnene-acrylonitrile copolymer rubber.

The nitrile group-containing highly saturated copolymer rubber preferably contains 10 to 60% by weight, based on the weight of the copolymer rubber, of units derived from a nitrile group-containing monomer in view of the oil resistance of the rubber/fibrous material composite, and further has an iodine value of not larger than 120, more preferably not larger than 100 and most preferably not larger than 80.

The nitrile group-containing highly saturated copolymer rubber, as combined with the fibrous material to form a composite, is subjected to vulcanization. The vulcanizing agent used is not particularly limited and usually selected from conventional sulfur or sulfur-containing vulcanizing agents and peroxide vulcanizing agents.

The rubber/fibrous material composite is prepared by a process wherein the fibrous material which has been treated with the adhesive composition is embedded in the nitrile group-containing highly saturated copolymer rubber, and the nitrile group-containing highly saturated copolymer rubber is vulcanized. The vulcanization is usually carried out at a temperature of 130° to 200° C. and a pressure of 0.5 to 10 MPa for 1 to 120 minutes.

The fibrous material, which has been treated with the adhesive composition of the present invention comprising (A) a self-crosslinking, carboxyl group-containing highly saturated nitrile-conjugated diene copolymer rubber latex and (B) a resorcinol-formaldehyde resin, has excellent abrasion resistance and water resistance and, even after heat aging, exhibits high flexibility and strength. Therefore, the composite of the present invention, which is composed of (i) a nitrile group-containing highly saturated copolymer rubber and (ii) the adhesive composition-treated fibrous material, is useful for a belt such as a timing belt to which a high heat resistance is required.

The composite of the present invention is further useful as a rubbery material for a toothed belt because the toothed belt exhibits a high stress. In general a toothed belt is composed of a main body having a plurality of teeth provided at regular intervals along the length of the belt and the back portion having embedded therein core wires extending along the length of the belt. The toothed portion of the main body is covered with a canvas which is made of, for example, an aromatic polyamide fiber, an urethane elastomer fiber or a polyester fiber, and which is treated with a resorcinol-formaldehyde resin latex. The core wires embedded in the back portion are made of a glass fiber, an aromatic polyamide fiber or a carbon fiber.

A toothed belt having the toothed portion and the back portion, both of which have a rubber layer made of the composite of the present invention, exhibits a high stress. The procedure by which the toothed belt is made is not particularly limited. Usually a covering canvas treated with the adhesive composition, core wires treated with the adhesive composition, and the nitrile group-containing highly saturated copolymer rubber are placed in this order in a mold, and thereafter, the rubber is vulcanized.

The invention will now be described specifically by the following examples. In the examples, comparative examples and reference examples, parts and % are by weight unless otherwise specified.

Preparation of Latex (A)

A pressure bottle having an inner volume of 1 liter was charged with 240 parts of water, 2.5 parts of sodium alkylbenzenesulfonate, 35 parts of acrylonitrile, 3 parts by weight of methacrylic acid and 0.1 part of N-methylol methacrylamide in this order. The inside of the bottle was flashed with nitrogen, and then 61 parts of butadiene was injected into the bottle. Then 0.25 part of ammonium persulfate as a polymerization initiator was added, and a polymerization was conducted at a temperature of 40° C. to give a latex of a self-crosslinking, carboxyl group-containing acrylonitrile-butadiene copolymer rubber.

The solid content in the self-crosslinking, carboxyl group-containing acrylonitrile-butadiene copolymer rubber latex was adjusted to 12%. An autoclave having an inner volume of 1 liter and equipped with a stirrer was charged with the 400 ml of the self-crosslinking, carboxyl group-containing acrylonitrile-butadiene copolymer rubber latex (total solid content: 48 g). Gaseous nitrogen was blown through the rubber latex for 10 minutes to remove oxygen dissolved therein. Then 100 mg of palladium acetate as a hydrogenation catalyst was dissolved in an aqueous nitric acid solution composed of 240 ml of water and nitric acid in an amount of 4 times by mole of the palladium. The thus- prepared palladium nitrate solution was added into the rubber latex. The inside of the autoclave was flashed twice with hydrogen, the pressure of hydrogen was increased to 30 atmospheric pressure, and then the content was heated to 50° C. to effect a reaction. After the reaction was conducted for 6 hours, the content was concentrated to a solid content of about 40% by using an evaporator to give a latex (hereinafter abbreviated to "A-1") of a self-crosslinking, carboxyl group-containing highly saturated acrylonitrile- butadiene copolymer rubber having an iodine value of 32.

Latexes (abbreviated to "A-2" to "A-5") of self-crosslinking, carboxyl group-containing highly saturated acrylonitrile-butadiene copolymer rubbers containing different amounts of self-crosslinking monomer units were made by the same procedures as that mentioned above, except that the amount of the N-methylol methacrylamide used was varied.

Latexes (abbreviated to "A-6" to "A-9") of self-crosslinking, carboxyl group-containing highly saturated acrylonitrile-butadiene copolymer rubbers containing different amounts of a carboxyl group were made by the same procedures as that mentioned above, except that the amount of methacrylic acid was varied.

Similarly, a latex (abbreviated to "B-1") of a highly saturated acrylonitrile-butadiene copolymer rubber, which contained a carboxyl group but did not contain self-crosslinking monomer units, and a latex (abbreviated to "C-1") of a highly saturated acrylonitrile-butadiene copolymer rubber, which did not contain a carboxyl group but contained self-crosslinking monomer units, were made.

Iodine value, average particle diameter and pH of the obtained rubber latexes were measured. The results are shown in Table 1.

TABLE 1

| Latex No. | A-1 | A-2 | A-3 | A-4 | A-5 | A-6 | A-7 | A-8 | A-9 | B-1 | C-1 |
|---|---|---|---|---|---|---|---|---|---|---|---|
| Amount of AN (%) | 35 | 35 | 35 | 35 | 35 | 35 | 35 | 40 | 40 | 35 | 35 |
| Amount of COOH group (ephr) | 0.05 | 0.05 | 0.05 | 0.05 | 0.05 | 0.02 | 0.07 | 0.03 | 0.05 | 0.05 | 0 |
| Amount of N-methylol methacrylamide (%) | 0.1 | 3.0 | 5.0 | 7.0 | 10.0 | 4.0 | 4.0 | 4.0 | 4.0 | 0 | 4.0 |
| Iodine value | 32 | 38 | 33 | 30 | 36 | 32 | 38 | 33 | 30 | 29 | 32 |
| Average particle diameter (μm) | 0.10 | 0.11 | 0.10 | 0.12 | 0.13 | 0.10 | 0.11 | 0.10 | 0.12 | 0.13 | 0.12 |
| Solid content (%) | 40.1 | 40.0 | 40.1 | 40.5 | 40.4 | 40.1 | 40.0 | 40.1 | 40.5 | 40.5 | 40.5 |
| pH | 8.8 | 8.7 | 8.8 | 9.0 | 8.8 | 8.8 | 8.7 | 8.3 | 8.9 | 9.0 | 8.8 |

Preparation of Aqueous Zinc Oxide Dispersion

According to the recipe shown in Table 2, an aqueous zinc oxide dispersion having a solid content of 50% was prepared by using a porcelain ball mill.

TABLE 2

| Zinc oxide #1 | 50 parts |
|---|---|
| Dimol N (45%) *1 | 15 |
| Ammonium casein (10%) | 50 |
| Water | 8 |
| Total | 123 parts |

*1 Sodium naphthalene-formaldehyde sulfonate supplied by Kao Corp.

Preparation of Adhesive Composition

According to the recipe shown in Table 3, 6.5 parts of resorcinol, 9.4 parts of formalin (37% concentration) and 3.0 parts of aqueous sodium hydroxide (10% concentration) were dissolved in 139.6 parts of water. The mixture was maintained at a temperature of 25° C. for 6 hours under agitation whereby a reaction was conducted to give an aqueous resorcinol-formaldehyde resin solution (RF solution). To the RF solution, 250 parts of each of nitrile rubber latexes A-1 through C-1 (40% concentration), 22.6 parts of aqueous ammonia (14% concentration) and 120.4 parts of water were added, and the mixture was maintained at a temperature of 25° C. for 20 hours under agitation whereby a reaction was conducted to give a resorcinol-formaldehyde resin latex (RFL solution). Then 40 parts of an aqueous HAF carbon dispersion (25% concentration) was added to the RFL solution to give an adhesive composition.

TABLE 3

| RF solution (Resorcinol-formaldehyde resin solution) | |
|---|---|
| Resercinol | 6.5 parts |
| Formaldehyde (37%) | 9.4 |
| Sodium hydroxide (10%) | 3.0 |
| Soft water | 139.6 |
| Total | 158.5 parts |
| RFL solution (Resorcinol-formaldehyde resin latex) | |
| Latex | 250.0 parts |
| RF solution | 158.5 |
| Aqueous ammonia (14%) | 22.6 |
| Soft water | 120.4 |
| Total | 551.5 parts |
| Adhesive composition | |
| RFL solution | 551.5 parts |
| Aqueous HAF carbon dispersion (25%) | 40.0 |
| Total | 591.5 parts |

Preparation of Adhered Rubber Formulation

According to the recipe shown in Table 4, a nitrile group-containing highly saturated copolymer rubber and formulation ingredients were kneaded together by a roll mill to prepare a rubber formulation sheet having a thickness of about 2.5 mm.

TABLE 4

| | (parts) | | |
|---|---|---|---|
| Formulation No. | i | ii | iii |
| Zetpol 2020 *2 | 100 | — | 60 |
| Zetpol 2000 *3 | — | 100 | — |
| ZSC 2295 *4 | — | — | 40 |
| Zinc oxide #1 | 5 | 5 | 5 |
| Stearic acid | 1 | 1 | 1 |
| SRF carbon black | 40 | 40 | 30 |
| Sulfur | 0.5 | — | — |
| Tetramethylthiuram disulfide | 1.5 | — | — |
| 2-Mercaptobenzothiazole | 0.5 | — | — |
| Peroximon F-40 *5 | — | 6 | 6 |

*2 Highly saturated acrylonitrile-butadiene copolymer rubber having an iodine value of 28 and a bound acrylonitrile content of 36%, supplied by Nippon Zeon Co.
*3 Highly saturated acrylonitrile-butadiene copolymer rubber having an iodine value of 4 and a bound acrylonitrile content of 36%, supplied by Nippon Zeon Co.
*4 Rubber formulation comprising Zetpol 2020, as the base polymer, having dispersed therein zinc dimethacrylate
*5 α,α'-bis(t-butylperoxyisopropyl)benzene EXAMPLES 1 to 5

A base fabric woven from nylon 66 was dipped with an adhesive composition prepared from each of latexes A-2 through A-5. Then the dipped base fabric was heat-treated at 180° C. for 2 minutes. The thus-treated nylon base fabric was superposed upon rubber formulation (i) prepared according to the recipe shown in Table 4, and the combined nylon base fabric/rubber was subjected to press vulcanization at a pressure of 5 MPa and a temperature of 150° C. for 30 minutes whereby a square nylon base fabric/-rubber composite having a size of 15 cm×15 cm was obtained.

Abrasion loss of the adhesive composition on the treated nylon base fabric of the composite was measured by using a Taber abrasion for carpet under a load of 1 kg, at an abrasion surface temperature of 120° C. (heated by an infrared lamp) and a disc revolution of 10,000. Abrasion resistance was evaluated based on the abrasion loss of the adhesive composition and expressed by the following five ratings.

5: No abrasion loss or abrasion loss is not larger than 25%
4: Abrasion loss is at least 25% but not larger than 50%
3: Abrasion loss is at least 50% but not larger than 75%
2: Abrasion loss is at least 75% but not larger than 90%
1: Abrasion loss is at least 90%

The results are shown in Table 5.

COMPARATIVE EXAMPLES 1 and 2

Nylon 66 base fabric/rubber composites were made and abrasion resistance was evaluated by the same procedures as described in Example 1 except that latex A-1 (carboxyl group-containing highly saturated acrylonitrile-butadiene copolymer rubber containing 0.1% of N-methylol methacryl-amide units, i.e., a self-crosslinking monomer units) and latex C-1 (carboxyl group-containing highly saturated acrylonitrile-butadiene copolymer rubber not containing N-methylol methacrylamide units) were separately used for the preparation of the adhesive compositions. The results are shown in Table 5.

TABLE 5

| | Co. Ex. | Example | | | | | Co. Ex. |
|---|---|---|---|---|---|---|---|
| | 1 | 1 | 2 | 3 | 4 | 5 | 2 |
| Latex No. | A-1 | A-2 | A-3 | A-4 | A-5 | A-8 | B-1 |
| Abrasion resistance (rating) | 3 | 5 | 5 | 5 | 5 | 5 | 2 |

As seen from the data in Table 5, the nylon base fabrics treated with the adhesive compositions of the present invention exhibits an enhanced abrasion resistance as measured by a Taber abrasion test, as compared with those which have been treated with the adhesive compositions prepared from a carboxyl group-containing highly saturated nitrile rubber which does not contain self-crosslinking monomer units or contains only a minor amount of said monomer units.

EXAMPLES 6 to 8

Nylon base fabric/rubber composites were made and their abrasion resistance was evaluated by the same procedures as described in Example 1 except that latexes A-6, A-7 and A-9 were used for the preparation of the adhesive compositions. The results are shown in Table 6.

COMPARATIVE EXAMPLE 3

A nylon base fabric/rubber composite was made and its abrasion resistance was evaluated by the same procedures as employed in Examples 6 to 8 except that latex (C-1) of a carboxyl group-containing highly saturated nitrile rubber which did not contain a self-crosslinking monomer units, i.e., N-methylol methacrylamide units, was used. The results are shown in Table 6.

TABLE 6

|  | Examples | | | Co. Ex. |
| --- | --- | --- | --- | --- |
|  | 6 | 7 | 8 | 3 |
| Latex No. | A-6 | A-7 | A-9 | C-1 |
| COOH (ephr) | 0.02 | 0.07 | 0.05 | 0 |
| Abrasion resistance (rating) | 5 | 5 | 5 | 2 |

As seen from Table 6, the base fabrics treated with the adhesive composition of the present invention prepared from a highly saturated nitrile rubber, containing both self-crosslinking monomer units and a carboxyl group, exhibit an enhanced abrasion resistance, as compared with the fabric treated with the adhesive composition prepared from a highly saturated nitrile rubber containing self-cross-linking monomer units but not containing a carboxyl group.

EXAMPLES 9 to 12

A nylon 66 base fabric was dipped with an adhesive composition prepared from latex A-2, and the dipped base fabric was heat-treated. Then the nylon 66 base fabric was superposed upon rubber formulation (ii) or (iii) prepared according to the recipe shown in Table 4, and the combined base fabric/rubber was subjected to press vulcanization at a pressure of 5 MPa and a temperature of 160 C. for 30 minutes whereby a square nylon 66 base fabric/rubber composite having a size of 15 cm×15 cm was obtained.

The abrasion resistance of the nylon 66 base fabric/rubber composite was evaluated by the same procedure as described in Example 1. The results are shown in Table 7.

TABLE 7

|  | Examples | | | |
| --- | --- | --- | --- | --- |
|  | 9 | 10 | 11 | 12 |
| Rubber formulation | ii | ii | iii | iii |
| Latex No. | A-2 | A-3 | A-2 | A-3 |
| Abrasion resistance (rating) | 5 | 5 | 5 | 5 |

As seen from the comparison of Examples 9 through 12 in Table 7 with Examples 1 and 2 in Table 5, the composite of the present invention, which comprises a nitrile group-containing highly saturated copolymer rubber and a fibrous material treated with the adhesive composition comprising (A) a self-crosslinking, carboxyl group-containing nitrile-conjugated diene copolymer rubber latex and a resorcinol-formaldehyde resin, exhibits a good abrasion resistance whether the composite is vulcanized with a peroxide vulcanizer (Examples 9–12) or a sulfur vulcanizer (Examples 1 and 2).

EXAMPLES 13 to 21

An RFL solution was prepared from each of latexes A-2 to A-9 according to the recipe shown in Table 3, wherein latex A-3 was used in two ways, in one of which latex A-3 was used as it was (Example 14), and in the other of which 3 parts of an aqueous zinc oxide dispersion having a composition shown in Table 2 was incorporated in latex A-3 (Example 15). To increase viscosity of the RFL solution, 3 parts of Alon A-20 (sodium polyacrylate) was added to the RFL solution. Then the RFL solution was cast on a glass sheet having a dam on the periphery of the sheet, and the cast solution was gradually dried to form a RFL film having a thickness of 0.5 mm.

The RFL film was heat-treated at 200° C. for 2 minutes whereby the RF resin phase was crosslinked. Tensile strength and water resistance of the heat-treated RFL film were evaluated. The tensile strength was measured by using an Instron tester at a drawing speed of 300 mm/min according to JIS K6301. The water resistance was evaluated by immersing the film in water at 50° C. for 72 hours, and thereafter, determining (1) the volume change (%) and (2) the tensile strength (MPa) according to JIS K6301. Further, to evaluate the heat resistance, the tensile strength was also measured at 150° C. according to JIS K6301. The results are shown in Table 8.

COMPARATIVE EXAMPLES 4 to 7

An RFL solution was prepared from each of latexes B-1 and C-1 according to the recipe shown in Table 3, wherein latexes B-1 and C-1 were used in two ways, in one of which the latexes were used as they were (Comparative Examples 4 and 6), and in the other of which 5 parts of an aqueous zinc oxide dispersion having a composition shown in Table 2 was incorporated in each latex (Comparative Examples 5 and 7).

RFL films were made from the RFL solutions and the properties thereof were evaluated by the same procedures as employed in Examples 13 to 21. The results are shown in Table 8.

TABLE 8

|  | Examples | | | | | | | | | Comparative Examples | | | |
| --- | --- | --- | --- | --- | --- | --- | --- | --- | --- | --- | --- | --- | --- |
|  | 13 | 14 | 15 | 16 | 17 | 18 | 19 | 20 | 21 | 4 | 5 | 6 | 7 |
| Latex No. | A-2 | A-3 | A-3 | A-4 | A-5 | A-6 | A-7 | A-8 | A-9 | B-1 | B-1 | C-1 | C-1 |
| Amount of zinc oxide (parts) | — | — | 3 | — | — | — | — | — | — | — | 5 | — | 5 |
| Abrasion resistance (rating) | 5 | 5 | 5 | 5 | 5 | 5 | 5 | 5 | 5 | 3 | 4 | 2 | 2 |
| Tensile strength (MPa) | 20.0 | 21.6 | 24.0 | 20.5 | 20.3 | 20.0 | 20.8 | 21.8 | 22.0 | 15.3 | 19.0 | 17.0 | 16.0 |
| Water resistance |  |  |  |  |  |  |  |  |  |  |  |  |  |
| Volume change (%) | 14.8 | 14.5 | 14.8 | 13.6 | 13.0 | 14.8 | 14.4 | 14.5 | 14.9 | 26.4 | 40.5 | 14.0 | 22.0 |
| Tensile strength (MPa) | 12.5 | 12.9 | 12.6 | 13.7 | 13.8 | 15.6 | 13.6 | 11.8 | 13.6 | 8.7 | 4.8 | 11.7 | 12.1 |
| Change of tensile | −38 | −40 | −46 | −33 | −32 | −22 | −35 | −46 | −38 | −43 | −75 | −31 | −24 |

TABLE 8-continued

|  | Examples | | | | | | | | | Comparative Examples | | | |
|---|---|---|---|---|---|---|---|---|---|---|---|---|---|
|  | 13 | 14 | 15 | 16 | 17 | 18 | 19 | 20 | 21 | 4 | 5 | 6 | 7 |
| strength (%) | | | | | | | | | | | | | |
| Heat resistance | | | | | | | | | | | | | |
| Tensile strength (MPa) | 7.0 | 7.7 | 7.2 | 8.4 | 8.9 | 9.0 | 7.8 | 7.0 | 7.8 | 4.0 | 2.1 | 6.3 | 6.3 |
| Change of tensile strength (%) | −65 | −64 | −69 | −59 | −56 | −55 | −62 | −68 | −65 | −74 | −89 | −63 | −61 |

As seen from Table 8, the film of the RFL adhesive composition prepared from a self-crosslinking, carboxyl group-containing highly saturated nitrile rubber latex exhibits a high tensile strength, a reduced change in volume after immersion in water, and a reduced change in tensile strength at a high temperature.

What is claimed is:

1. An adhesive composition comprising:

A) a latex of a self-crosslinking, carboxyl group containing a nitrile-conjugated diene copolymer rubber having an iodine value not larger than 120 and containing at least 0.02 equivalent weight, per 100 parts by weight of the copolymer rubber, of a carboxyl group; said latex having a pH value not larger than 9.0, and said copolymer rubber being a hydrogenated product of a copolymer comprised, based on the weight of the copolymer of:

a) 30 to 80% by weight of conjugated diene monomer units, b) 10 to 60% by weight of α, β-unsaturated nitrile monomer units, c) 0.3 to 10% by weight of an ethylenically unsaturated self-crosslinking monomer units, d) 1 to 10% by weight of ethyleneically unsaturated carboxylic acid monomer units, and e) 0 to 50% by weight of at least one copolymerizable other ethylenically unsaturated monomer units, and B) 5 to 30 parts by weight, based on 100 parts by weight of said copolymer rubber latex, of a resorcinol-formaldehyde resin.

2. The adhesive composition according to claim 1 wherein said self-crosslinking, carboxyl group-containing highly saturated nitrile-conjugated diene copolymer rubber has an iodine value not larger than 80, contains 0.5 to 5% by weight, based on the weight of the copolymer rubber, of self-crosslinking monomer units, and contains 0.02 to 0.10 equivalent weight, per 100 parts by weight of the copolymer rubber, of a carboxyl group.

3. The adhesive composition according to claim 1, wherein the conjugated diene monomer is selected from the group consisting of 1,3-butadiene, isoprene, 2,3-dimethylbutadiene, 1,3-pentadiene and halogen-substituted butadienes; the α,β-unsaturated nitrile monomer is selected from the group consisting of acrylonitrile and methacrylonitrile; the ethylenically unsaturated self-crosslinking monomer is selected from the group consisting of acrylamide, methacrylamide, N-substituted or $N,N^1$-disubstituted acrylamide and N-substituted or $N,N^1$-disubstituted methacrylamide; and the ethylenically unsaturated carboxylic acid monomer is selected from the group consisting of acrylic acid, methacrylic acid, itaconic acid and maleic acid.

4. The adhesive composition according to claim 1, wherein said self-crosslinking, carboxyl group-containing highly saturated nitrile-conjugated diene copolymer rubber is a hydrogenated product of a copolymer comprised of 1,3-butadiene, acrylonitrile, methacrylic acid and N-methylol methacrylamide.

5. The adhesive composition according to claim 1, wherein the ratio of a resorcinol/formaldehyde used for the preparation of the resorcinol-formaldehyde resin is 1/1 to 1/5 by mole.

6. The adhesive composition according to claim 1, which further comprises not more than 5 parts by weight, based on the weight of the copolymer rubber, of a compound of a metal selected from the group consisting of magnesium, calcium, barium and zinc.

7. The adhesive composition according to claim 6, wherein said metal compound is an oxide or hydroxide of magnesium, calcium, barium or zinc.

* * * * *